US008943205B2

(12) United States Patent
Dutta et al.

(10) Patent No.: US 8,943,205 B2
(45) Date of Patent: Jan. 27, 2015

(54) GENERALIZED COORDINATE SYSTEM AND METRIC-BASED RESOURCE SELECTION FRAMEWORK

(75) Inventors: Debojyoti Dutta, Santa Clara, CA (US); Subrata Banerjee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 13/455,828

(22) Filed: Apr. 25, 2012

(65) Prior Publication Data

US 2013/0290536 A1 Oct. 31, 2013

(51) Int. Cl.
*G06F 15/173* (2006.01)
(52) U.S. Cl.
USPC .......................... 709/226; 709/225; 709/229
(58) Field of Classification Search
USPC ......... 709/201, 202, 213, 214, 223, 224, 226, 709/225
See application file for complete search history.

(56) References Cited

U.S. PATENT DOCUMENTS

| | | | |
|---|---|---|---|
| 6,643,260 B1 | 11/2003 | Kloth et al. | |
| 6,978,006 B1 * | 12/2005 | Polcyn | 379/265.12 |
| 7,225,188 B1 | 5/2007 | Gai et al. | |
| 7,584,112 B1 * | 9/2009 | Dagum et al. | 705/7.22 |
| 7,739,426 B1 | 6/2010 | Steiss et al. | |
| 8,156,500 B2 * | 4/2012 | Helander | 718/104 |
| 2008/0065450 A1 | 3/2008 | Jordan et al. | |
| 2010/0125433 A1 * | 5/2010 | Jordan et al. | 702/155 |
| 2011/0116377 A1 | 5/2011 | Batz et al. | |

FOREIGN PATENT DOCUMENTS

EP 2424192 A2 2/2012

OTHER PUBLICATIONS

"Edge Computing", Wikipedia Foundation, Inc., http://en.wikipedia.org/wiki/edge_computing, Aug. 30, 2011; pp. 1-2.
Shan, et al., "Job Scheduling in a Heterogeneous Grid Environment", NASA Ames Research Center, Nov. 2004, pp. 1-12.
Shinde, et al., "Similarity Search and Locality Sensitive Hashing Using Ternary Content Addressable Memories", ACM, SIGMOD '10, Jun. 6-11, 2010, pp. 1-12.

* cited by examiner

*Primary Examiner* — Viet Vu
(74) *Attorney, Agent, or Firm* — Parker Ibrahim & Berg LLC; James M. Behmke; Stephen D. LeBarron

(57) ABSTRACT

In one embodiment, an n-dimensional resource vector for each of a plurality of resources in a computer network is determined, each n-dimensional resource vector having n property values for a corresponding resource of the plurality of resources. Upon receiving a request for one or more resources of the plurality of resources, where the request indicates one or more desired property values, the techniques convert the desired property values of the request into an n-dimensional request vector, determine a distance between each resource vector and the request vector, and provide a response to the request, the response indicating one or more closest match resources for the request based on the distances.

19 Claims, 11 Drawing Sheets

US 8,943,205 B2

GENERALIZED COORDINATE SYSTEM AND METRIC-BASED RESOURCE SELECTION FRAMEWORK

TECHNICAL FIELD

The present disclosure relates generally to cloud computing systems, and, more particularly, to resource selection.

BACKGROUND

Generally, the "cloud" refers to computing resources, such as software, services, and information, connected via a network, e.g., the Internet. "Cloud computing" can thus be defined as Internet-based computing in which these computing resources are dynamically provisioned and allocated to client or user computers or other devices on-demand from a pool of resources available via the cloud. Cloud computing is envisioned as a way to allocate access to these resources according to particular needs of a user.

Allocating access to these resources, however, presents various challenges. For example, there are an ever increasing number of computing resources within the cloud possessing an ever increasing variety of capabilities and attributes, and, further, there are an ever increasing number of users having various computing needs. Selecting particular resources for a given task is thus a complex problem.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an n-dimensional resource vector is determined for each of a plurality of resources in a computer network, where each n-dimensional resource vector has n property values for a corresponding resource of the plurality of resources. The technique receives a request for one or more resources of the plurality of resources, the request indicating one or more desired property values, and converts the desired property values into an n-dimensional request vector. The technique may then determine a distance between each resource vector and the request vector, and may thus provide a response, which indicates one or more closest match resources based on the distances.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
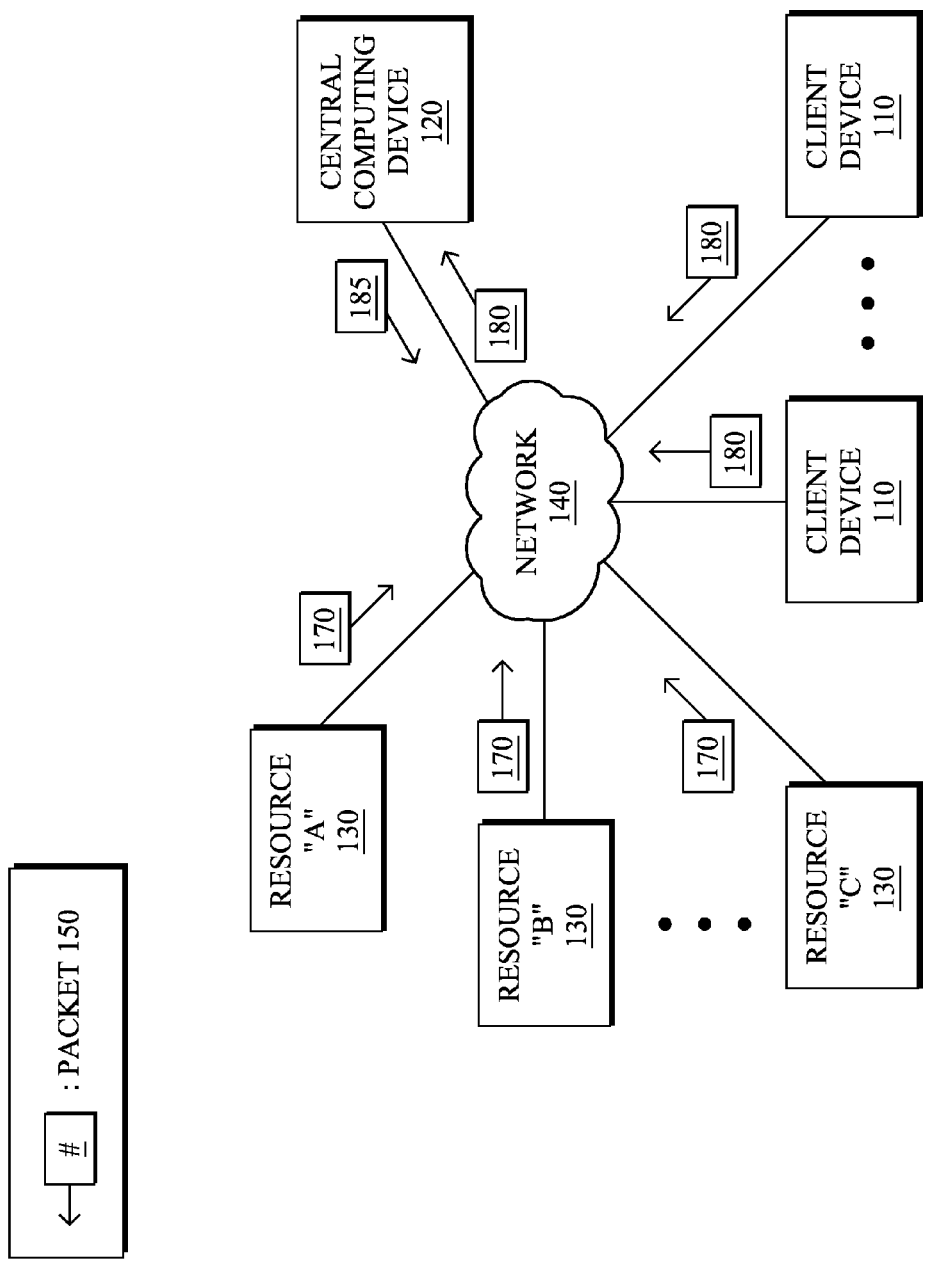
FIG. 1 illustrates an example computer network.

For example, FIG. 1 illustrates an example computer network 100 illustratively comprising a plurality of devices, such as a client device(s) 110, a centralized computing device (e.g., a server, a head-end application device, a network management server or "NMS," etc.) 120, and a plurality of other devices 130 (e.g., "A," "B," "C," etc.), generally referred to as "resources" herein. Generally, the client device 110, computing device 120, and the plurality of resources 130 may be interconnected by a network 140, for example, WANs (e.g., the Internet), LANs, etc., through various methods of communication, such as wired and/or wireless links. Those skilled in the art will understand that any number of computing resources, devices, links, etc. may be used in network 100, and that the view shown herein is for simplicity.

Data packets 150 (e.g., attribute information 170 and/or requests 180 and responses 185, as described below) may be exchanged among the nodes/devices of the computer network 100 using predefined network communication protocols as will be understood by those skilled in the art. In this context, a protocol consists of a set of rules defining how the nodes interact with each other.

Figure 2:
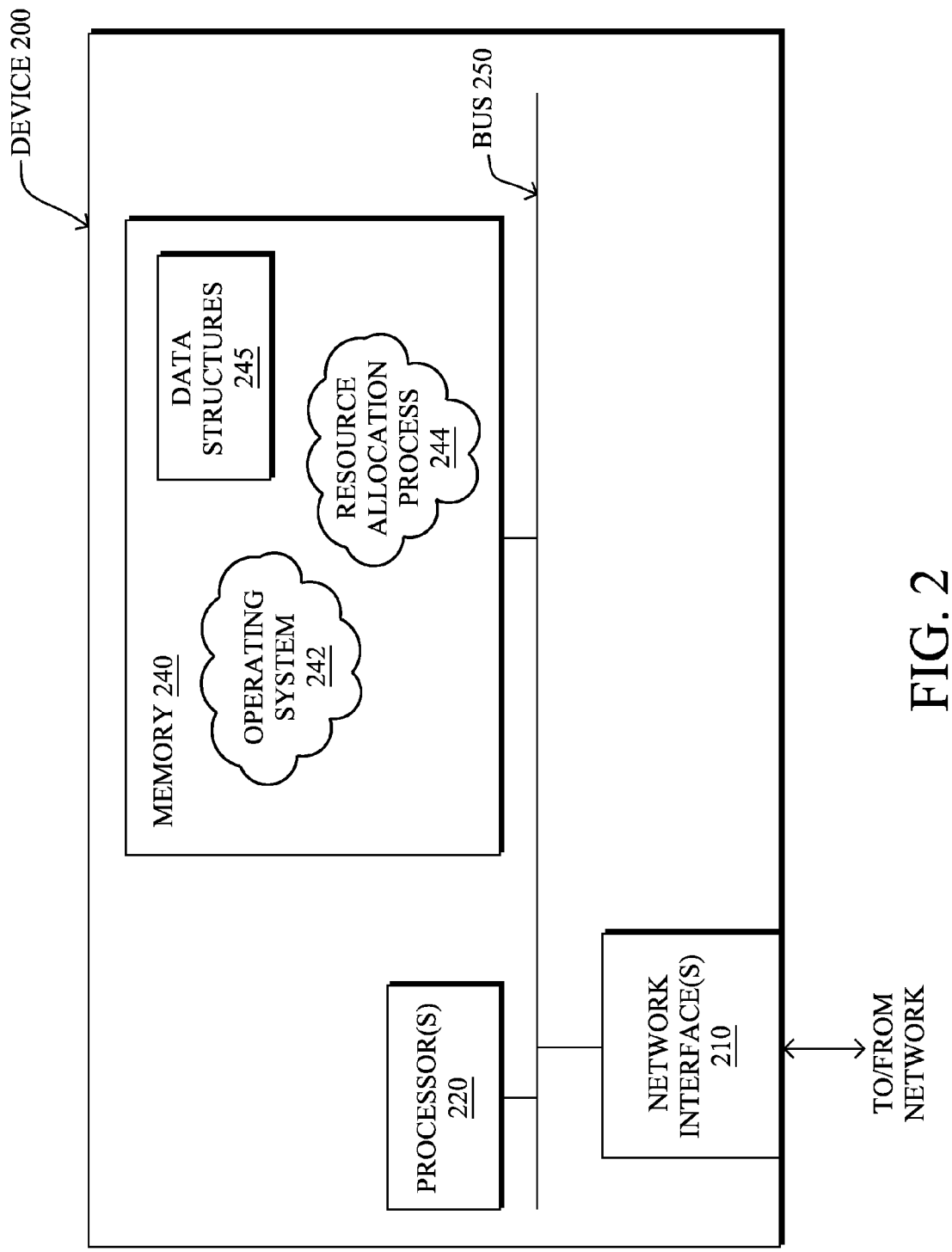
FIG. 2 illustrates an example computing device.

FIG. 2 is a schematic block diagram of an example computing device 200 that may be used with one or more embodiments described herein, e.g., particularly as computing device 120 or in certain embodiments client device(s) 110 (e.g., for client-side operation of the techniques herein). The device 200 may comprise one or more network interfaces 210, at least one processor 220, and a memory 240 interconnected by a system bus 250. Network interface(s) 210 contain the mechanical, electrical, and signaling circuitry for communicating data over links coupled to network 100. The network interfaces 210 may be configured to transmit and/or receive data using a variety of different communication protocols, as will be understood by those skilled in the art.

The memory 240 comprises a plurality of storage locations that are addressable by processor 220 for storing software programs and data structures associated with the embodiments described herein. The processor 220 may comprise necessary elements or logic adapted to execute the software programs and manipulate data structures 245. An operating system 242, portions of which are typically resident in memory 240 and executed by the processor, functionally organizes the device by, inter alia, invoking operations in support of software processes and/or services executing on the device. These software processes and/or services may comprise an illustrative "resource allocation" process/services 244, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having resource allocation process 244 encoded thereon. Processor 220 can also include a fixed logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, cloud computing can be defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines, edge computing devices, etc. For instance, resources may include service devices (firewalls, deep packet inspectors, traffic monitors, etc.), processing devices (brute force processing capability), storage devices (e.g., servers, network attached storages, storage area network devices), etc.

Cloud computing, in particular, is envisioned as a way to allocate access to these resources according to particular needs of a user. However, as mentioned, allocating access to these resources presents various challenges. For example, there are an ever increasing number of computing resources within the cloud possessing an ever increasing variety of capabilities and attributes, and, further, there are an ever increasing number of users having various computing needs. Selecting particular resources for a given task is thus a complex problem.

The techniques herein, therefore, represent resources as a multidimensional vector, such that for a given a query, e.g., with defined distance/similarity measures and optional attribute weights, one or more "closest match" resources may be determined. That is, a framework is defined for resource selection where such resources may be chosen based on a distance measure using a multidimensional representation of the properties and capabilities of the resources, as compared to that of the particular request for allocated resources.

Specifically, according to one or more embodiments of the disclosure as described in further detail below, an n-dimensional resource vector for each of a plurality of resources in a computer network is determined, each n-dimensional resource vector having n property values for a corresponding resource of the plurality of resources. Upon receiving a request for one or more resources of the plurality of resources, where the request indicates one or more desired property values, the techniques convert the desired property values of the request into an n-dimensional request vector, determine a distance between each resource vector and the request vector, and provide a response to the request, the response indicating one or more closest match resources for the request based on the distances.

Illustratively, the techniques described herein may be performed by hardware, software, and/or firmware, such as in accordance with the resource allocation process 244, which may contain computer executable instructions executed by the processor 220 to perform functions relating to the techniques described herein.

Operationally, the resource allocation process 244, or, more generally, the device 200, e.g., computing device 120, first gathers information that represents the capability attributes or "resource properties" of resource devices within the network 100. This information may be represented, for example, by attribute information 170 sent from resource devices 130 in the network 100 and received by computing device 120, as depicted in FIG. 1. Notably, the information representing the capability attributes of devices in the data center may be received in real-time, i.e., as the capability attributes for a device changes, the device sends information representing the latest/updated capability attribute. A variety of techniques may employed for the reception of this attribute information 170 containing capability attributes of resources, such as publish-subscribe, polling/querying, etc.

For example, resources such as server resources, as well as the access switches, firewall devices, load balancers, storage devices, etc. in the network (e.g., within one or more data centers), may send messages, e.g., attribute information 170, that contain an indication of their respective resource properties to the computing device 120. That is, each of these resources has a corresponding set of resource property values or attributes that are useful for purposes of management and provisioning service requests in a manner that is optimal to both the requestor, e.g., client device 110 (such as a customer), and a cloud service provider. As an example, these property values or capability attributes can include any one or more of the following: a central processing unit (CPU) count, a CPU speed, processor unit utilization, an available memory, hypervisor type, power consumption; amount of local storage availability, average load, a number of virtual machine (VM) resources, number of load balancers, outgoing/downlink bandwidth, an incoming/uplink bandwidth, an average incoming delay, an average outgoing delay, a communication jitter metric, a longitude and latitude, etc. Notably, the set of particular attributes/properties discovered may vary over time, depending upon configuration and/or device capabilities.

Figure 3:
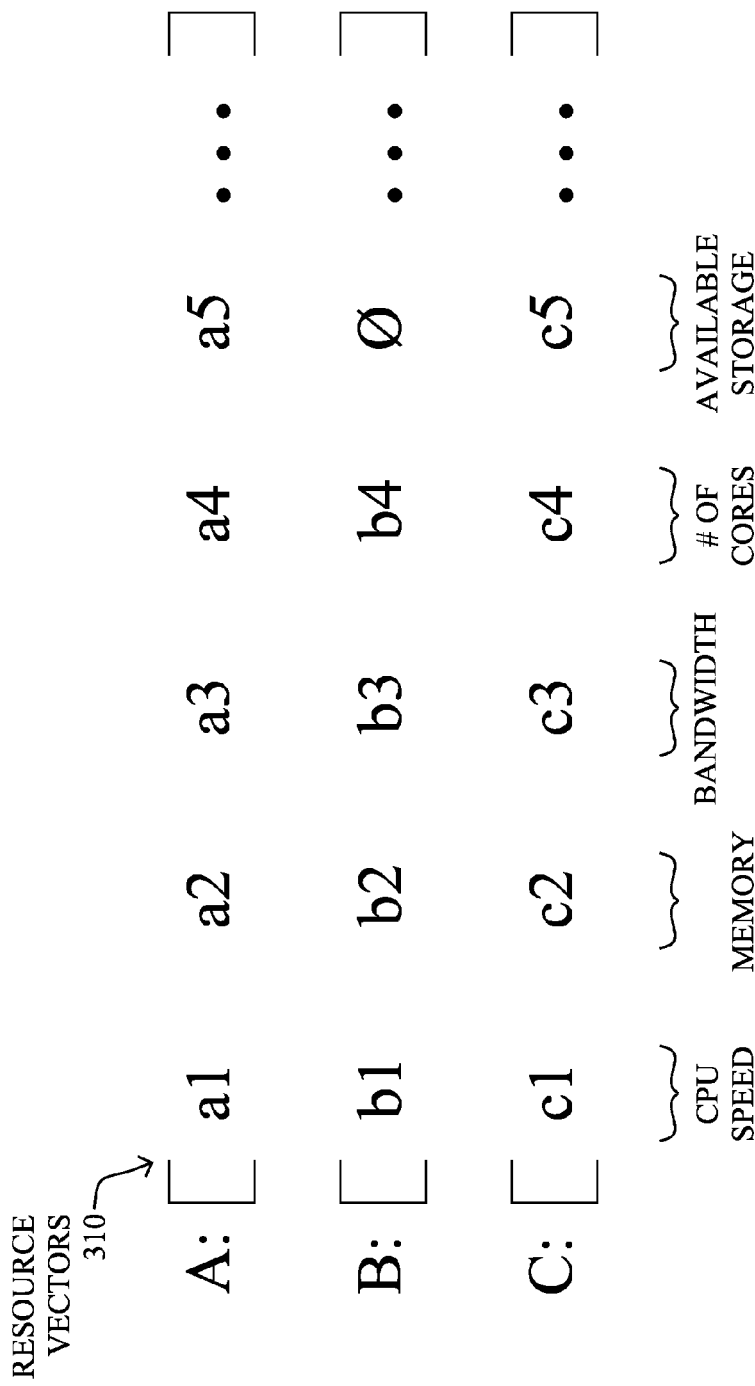
FIG. 3 illustrates an example of property-based resource vectors.

Upon receiving the resource property values from the resources 130, the resource allocation process 244 of the central computing device 120 may then convert these values into n-dimensional resource vectors. For example, as shown in FIG. 3, the computing device 120 creates one or more resource vector(s) 310 for each of resource(s) 130, e.g., resources A, B, C, etc. In particular, each of the resource vector(s) 310 may comprise one or more entries corresponding to the particular attributes/properties configured as mentioned above. For example, as shown, resource vectors 310 comprise entries, i.e., "dimensions," corresponding to CPU speed, available memory, bandwidth, number of cores, available storage, etc. The resource vectors 310 can be determined in real-time for each resource. That is, as the resource properties or attributes change, e.g., where available resource levels change dynamically, corresponding resource vector values likewise change.

Note that for any particular resource that did not report a particular property value, e.g., resource B not reporting any available storage (perhaps resource B is not a storage device or simply not configured to report its available storage), a zero value may be assigned to that property value/dimension of the respective resource vector 310, accordingly. In other words, each dimension within the n-dimensional resource vectors 310 corresponds to a resource property value or attribute. For instances where a resource does not have a resource property value or attribute (or fails to report the resource property or attribute), a zero value (or some other "null" value) can be substituted for that resource property value or attribute, i.e., a zero/null value can be inserted into any dimension within the resource vector that fails to have a corresponding value.

Figure 4:
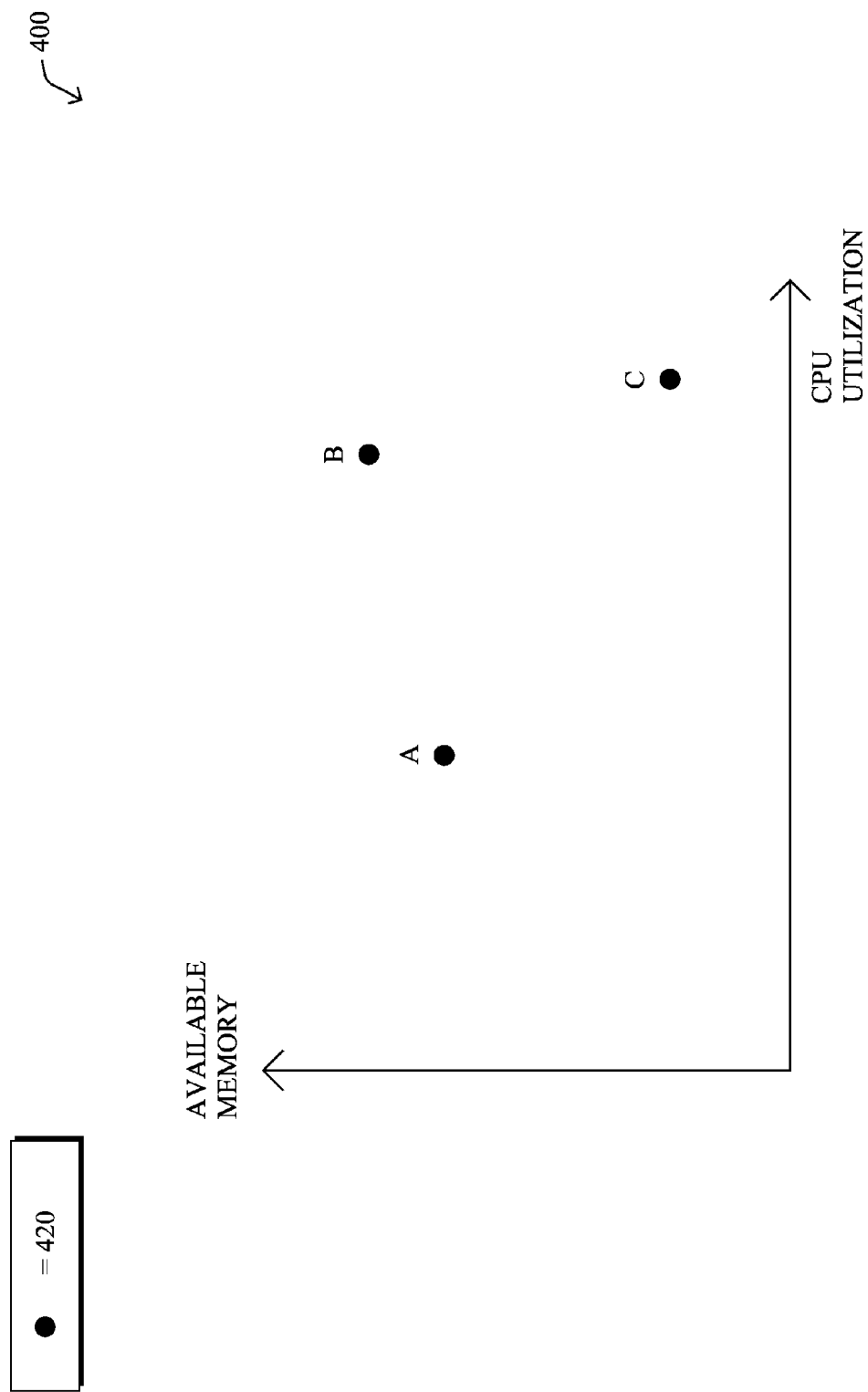
FIG. 4 illustrates an example of a coordinate system mapping the resource vectors.

According to one or more embodiments herein, the n-dimensional vector can be applied (visualized) dimensionally, e.g., within Euclidean space dimensions, whereby each axis/dimension refers to a capability or attribute. For example, with reference now to FIG. 4, an example of a generalized coordinate system 400 is shown where resources 130, e.g., A, B, and C, are plotted based on their respective dimensional vectors (plots 420). For instance, FIG. 4 illustrates an example in which metrics comprise a central processor unit (CPU) utilization (x-axis) and available memory (y-axis). CPU utilization indicates how much of an overall computing power is being used and the available memory indicates how much memory is available for use by each of computing resources 130. Those skilled in the art will appreciate that the use of two dimensions is merely a visualization representation for simplicity, and that any number of dimensions (e.g., based on length of vector 310) may be used for plotting resources within the dimensional space.

According to the embodiments herein, a request 180 is received at the centralized computing device 120 from a requesting device, e.g., client device(s) 110, the request 180 may generally indicate one or more desired properties for the allocation of available resources. The desired property or properties are converted by the receiving computing device 120 into an n-dimensional request vector.

Figure 5:
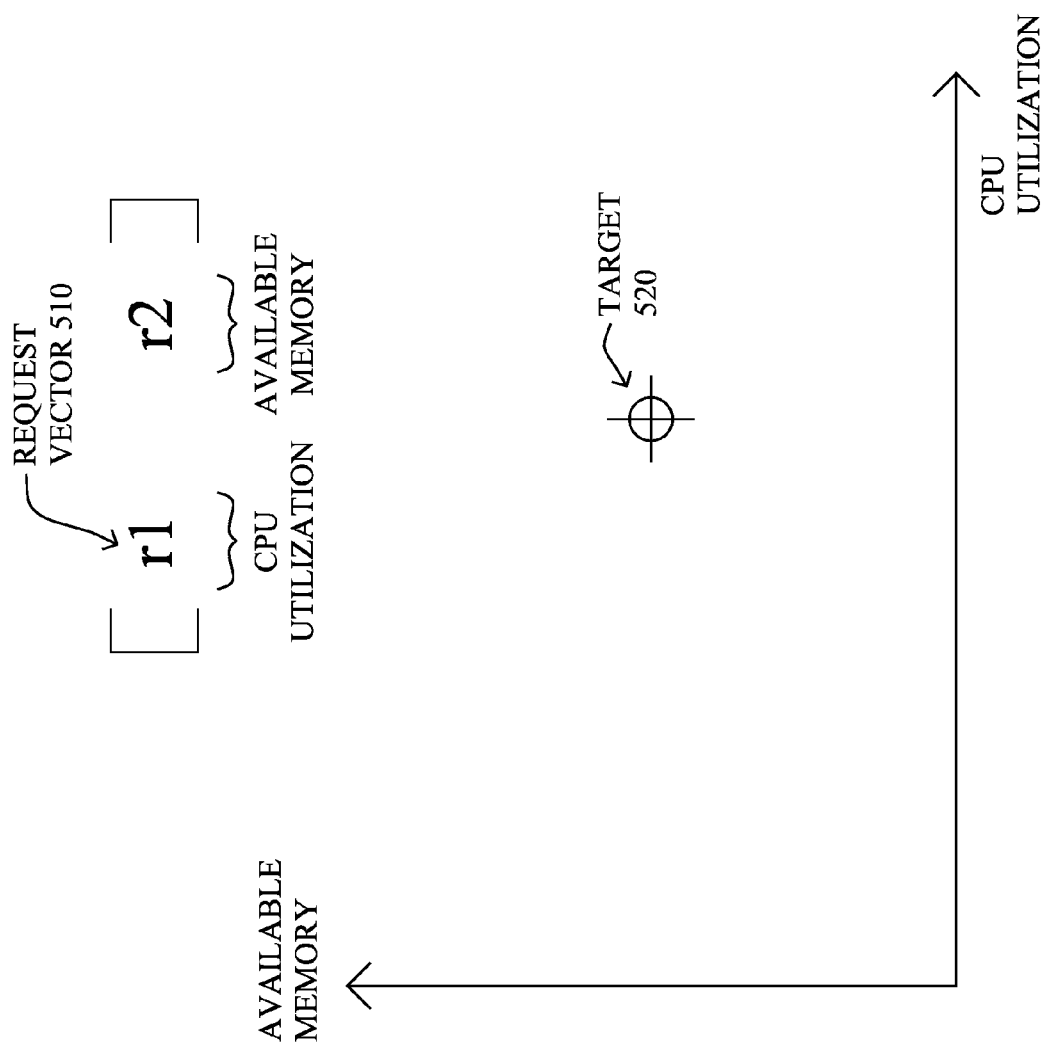
FIG. 5 illustrates an example request vector and a corresponding coordinate.

As shown in FIG. 5, computing device 120 received request a request, e.g., request 180, and generated a request vector 510. Request vector 510 may comprise fewer dimensions than a total number of dimensions collected by computing device 120, i.e., request 180 may comprise a subset of desired resource properties. For example, while FIG. 4 illustrated two dimensions for the sake of visual simplicity, FIG. 5 may illustrate two dimensions because those are the only two indicated desired properties (e.g., CPU utilization and available memory). In other words, the value of dimensions "n" for the request vector 510 is configurable depending on the property values or attributes to be considered when allocating the resources. In this instance, where the request vector is shorter than the resource vectors, the value "n" is defined by the request vector, such that only those corresponding attributes (dimensions) of the request vector are used, i.e., the values of the resource vectors that do not correspond to the request vector may be assigned a zero value in order to eliminate their consideration in the allocation algorithm described below. Notably, the request vector 510 results in a corresponding plotted location of target 520 (e.g., a "target" resource attribute combination) in the n-dimensional space, similar to plotted locations 420 as described above.

According to the embodiments herein, the resource allocation process 244 is configured to allocate the "closest match" resources 130 based on the request 180, and allocate those resources accordingly. Note that as described herein, "providing a response to the request" may be embodied as a response message 185 with a listing of the one or more closest matches determined as described herein, or else may be embodied as an allocation of the resources in response to the request, each as may be appreciated by those skilled in the art.

In particular, according to the techniques described herein, a dimensional distance is determined between the request vector 510 and each resource vector 310 in order to determine the effective similarity between the desired properties and the actual resource properties of available resources. For example, the distance may be determined based on the Euclidean space example discussed above, as a straightforward computation of distance between points. Alternatively, the techniques may apply the law of cosines, such that a distance between a particular resource vector and the request vector is the cosine distance between the two. For example, the dot product of vectors in terms of their respective lengths and the angle they enclose can be determined by: $\cos \theta = (x \cdot y)/(|x||y|)$.

Figure 6:
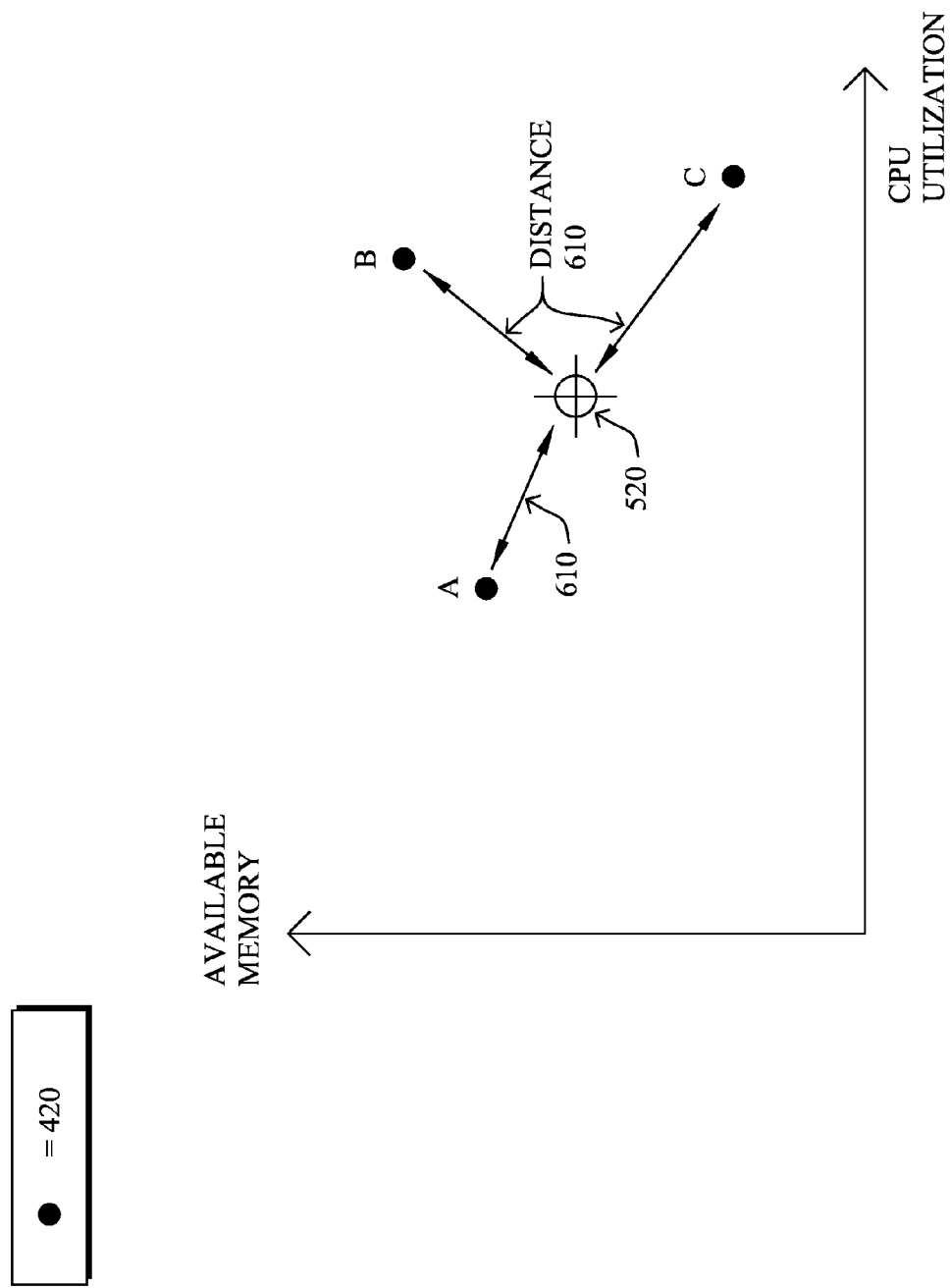
FIG. 6 illustrates an example of distance-based resource selection according to the resource vectors and the request vector.

Illustratively, FIG. 6 shows an example distance calculation between the desired target point 520 and each of the plurality of resource plots 420, i.e., based on the request vector and resource vectors, respectively. The resultant distances 610 may then be used to determine one or more closest matching resources for the request, that is, the most similar or the nearest neighbor(s).

Note that in some embodiments, the set of closest match resources may comprise a list of a plurality of resources, such as one that ranks one or more closest match resources based on the similarity or proximity. For instance, when the request 180 indicates a number of "k" resources, or else when otherwise configured to do so, the resource allocation process 244 may return k closest matches. The list of matching resources may be a simple list, or else may be ordered, e.g., based on the respective distances 610.

According to one or more specific embodiments herein, the resource allocation process 244 (i.e., the similarity or nearest neighbor algorithm) may also account for any weighting applied to the request vector (or any configured weighting). For instance, in some embodiments, one or more request value dimensions may have a weight applied thereto, in order to indicate a greater importance or priority for that particular dimension (desired resource property). For example, assume that a request desires a certain number of processor cores, a certain available bandwidth, and a certain available memory. Assume further that the request indicates, through a weighting of the values, that the available memory is the most important value, e.g., by a factor of 2. Thus, determining the distance between each resource vector and the request vector can be based on corresponding weighting to one or more dimensions, e.g., in the example-above, more credit is given to resources that are closer to the desired available memory value of the resource vector. In this manner, the weighting acts as a scaling factor to one or more particular vector dimensions in order to influence the selection algorithm based on more or less important properties, accordingly.

Further still, in one or more particular embodiments herein, the list of resources may rank the one or more closest match resources based on prior resource selection. That is, after the response indicates closest match resources, one or more resources may be selected (e.g., resource A). This selection can be used in subsequent responses to account for prior selection by applying additional weighting to the prior selected resource (e.g., resource A).

Figure 7A:
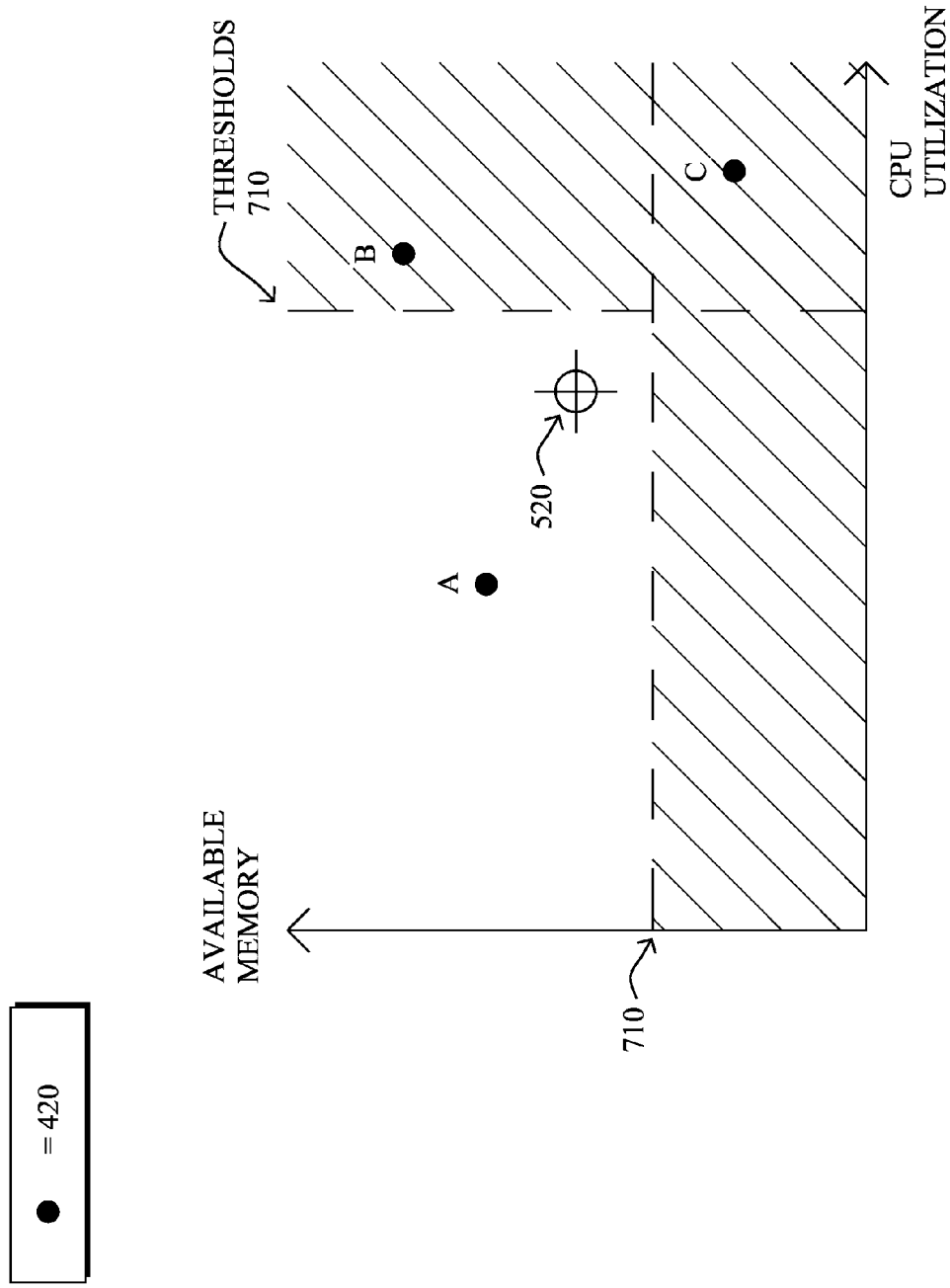
FIGS. 7A-7B illustrate the example of distance-based resource selection according to the resource vectors and the request vector using thresholds.

In some embodiments, a threshold may be provided to limit the resources indicated in the response. For example, as shown in FIG. 7A, minimum thresholds 710 may be applied to any particular attribute, thus corresponding to any particular dimension, accordingly. For example, assume that a request 180 indicates a maximum CPU utilization and a minimum available memory. As such, certain resources may not be acceptable options, regardless of their being a closest match resource. In the event that no available resources meet the criteria, then the thresholds may be relaxed or removed in order to provide a result. On the other hand, the response may indicate an empty set (no matches), at which time the requesting device (e.g., client 110) may decide to relax or remove the thresholds 710.

Figure 7B:
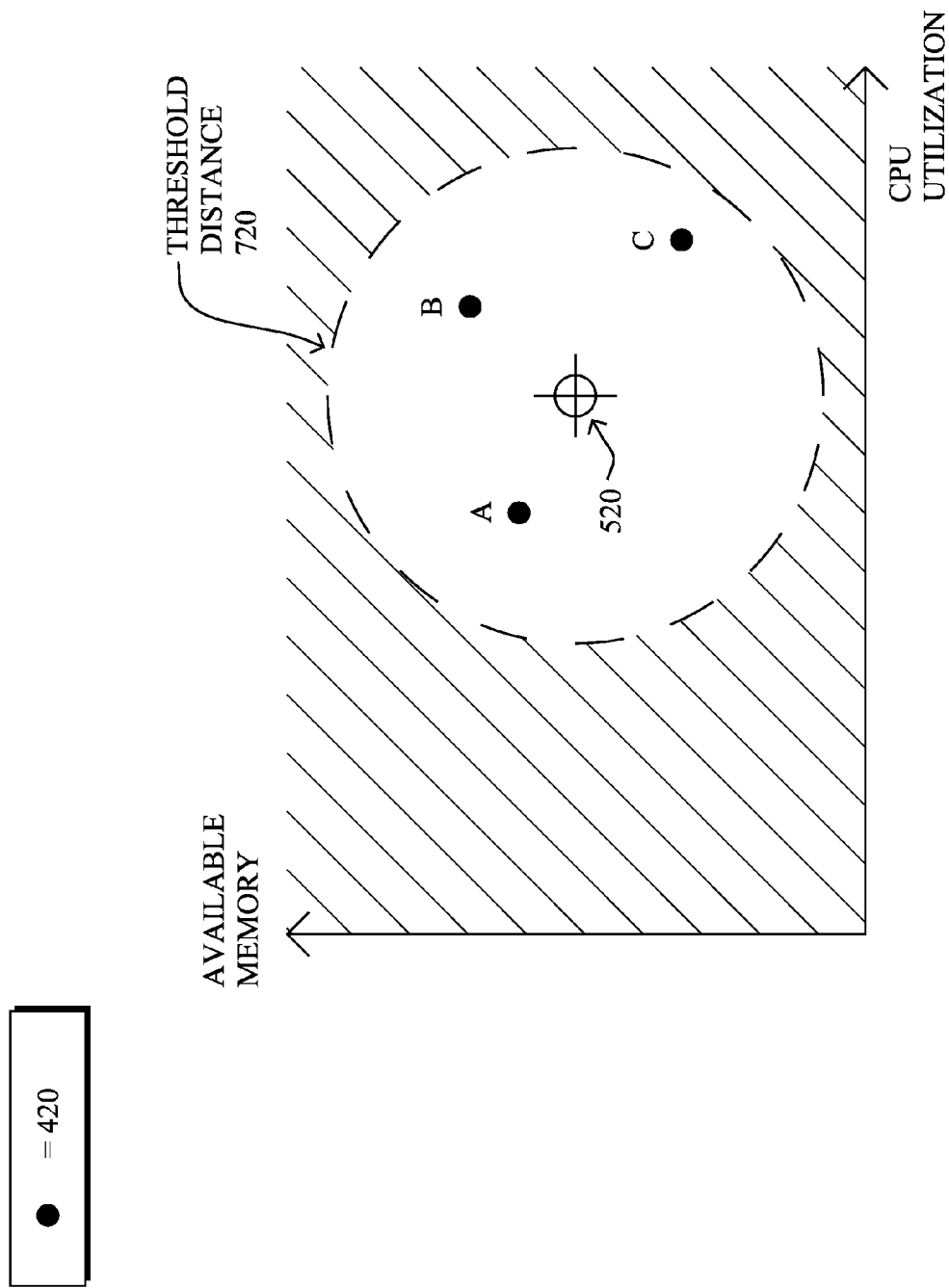

Alternatively or in addition, as shown in FIG. 7B, the closest match resources can be limited to resources having a corresponding distance within a threshold distance 720. This may be particularly useful where a list of available resources is to be returned, such that the list is limited to certain resources that fall within the threshold distance 720, regardless of the number (k) of desired responses. As illustrated, the threshold distance 720 is represented as a circle (a threshold distance radius) with target 520 at the center, however, the threshold distance can be any definable multi-dimensional distance from target 520, e.g., different distances for different dimensions. Also, a combination of thresholds 710 and 720 may be used, e.g., defining certain minimum/maximum values for one or more attributes, and certain distance thresholds for one or more of those attributes and/or other attributes.

Moreover, in certain embodiments, the thresholds may be used in place of, rather than in addition to, the actual values for one or more desired resource properties/attributes. For example, assume that a request indicates a certain CPU speed, and merely indicates a minimum available memory, as opposed to a specific available memory value. In this case, the selection algorithm may allocate resources based on CPU speed, regardless of available memory, so long as the available memory is greater than the defined threshold.

Notably, the techniques herein may be optimized for use with clustered resources. In particular, clustering of resources is known in the art, and is generally based on grouping similar resources, based on one or more attributes. For example, any of a variety of clustering algorithms now known or hereinafter developed may be used to group resources based on their attributes, such as K-means (K-center) clustering, fuzzy clustering, quality threshold (QT) clustering, and locality-sensitive clustering. In general, an example clustering algorithm groups devices based on distances between vectors representing the plurality of resource properties (capability attributes) for respective devices. For instance, K-center clustering is used to group the resources data into K groups based on the similarity of their attributes, such that that maximum cluster size is minimized.

Figure 8A:
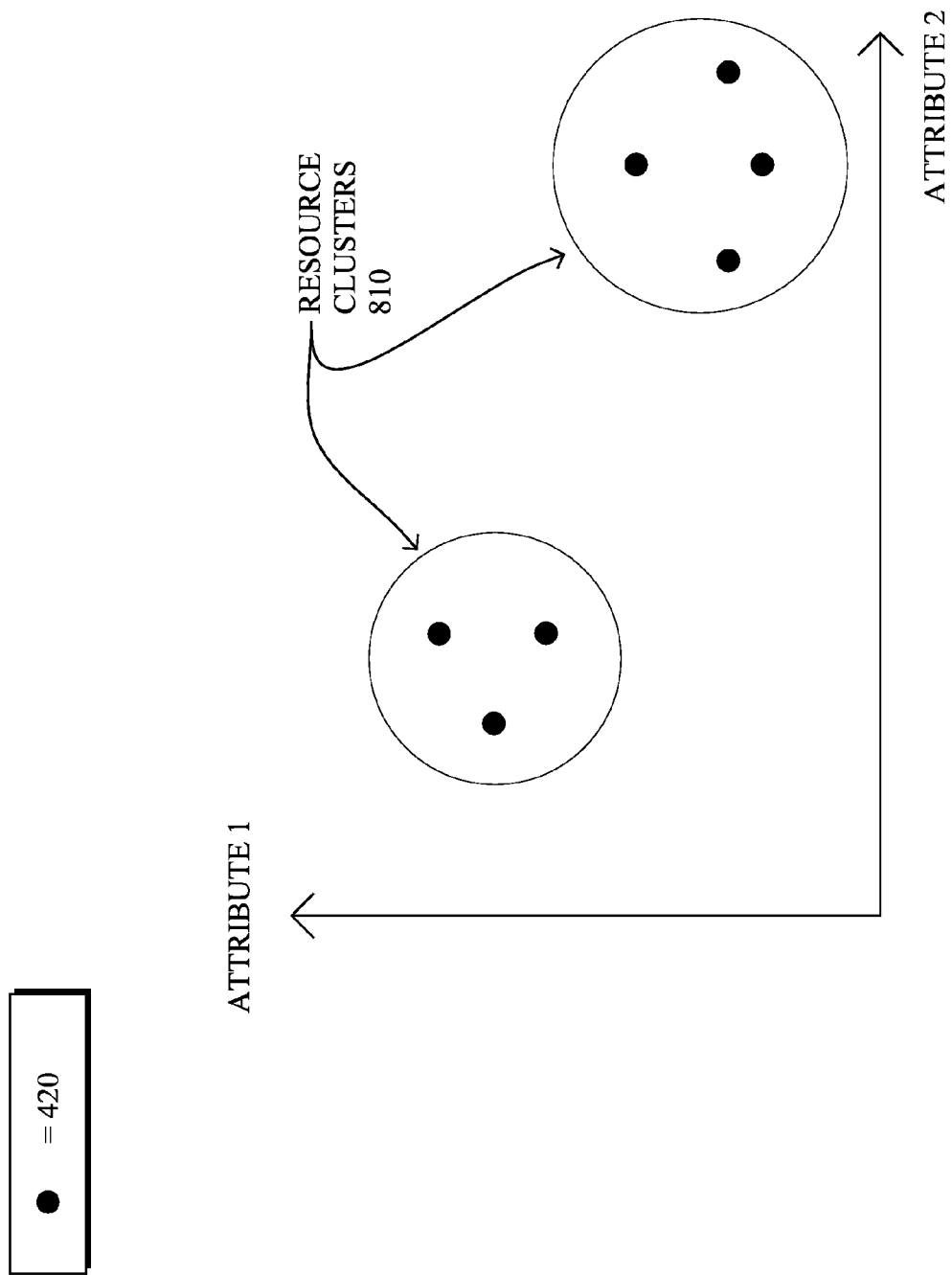
FIGS. 8A-8B illustrate an example of clustered resource selection.
Figure 8B:
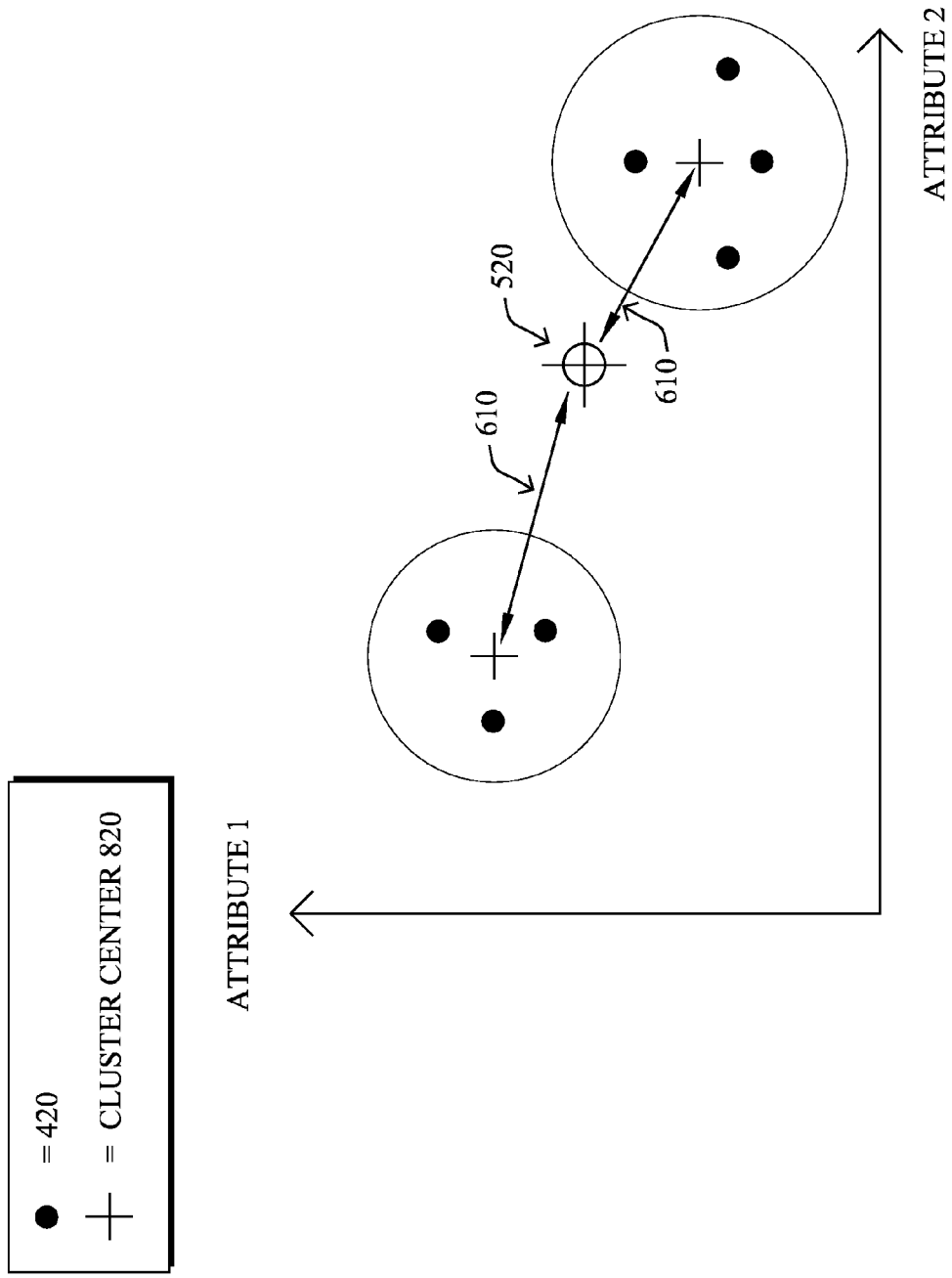

FIG. 8A illustrates an example of resource clustering based on similarly situated (e.g., attribute-wise or property-wise) resources. Illustratively, various clusters 810 may be defined in a manner outside of the scope of the techniques herein. As shown in FIG. 8B, then, according to the techniques herein, when selection of a cluster of resources is in order, the resource allocation process may be configured to select a cluster or otherwise rank clusters based on coordinate "centers" 820 of the clustered resources of a particular cluster 810, accordingly. The centers 820 may be graphically-based centers, attribute averages, weighted averages, etc. As such, the distance 610 from the request vector to the center(s) 820 of each of the clusters 810 may then be determined, as opposed to or in addition to the distance to individual resources as described above.

Figure 9:
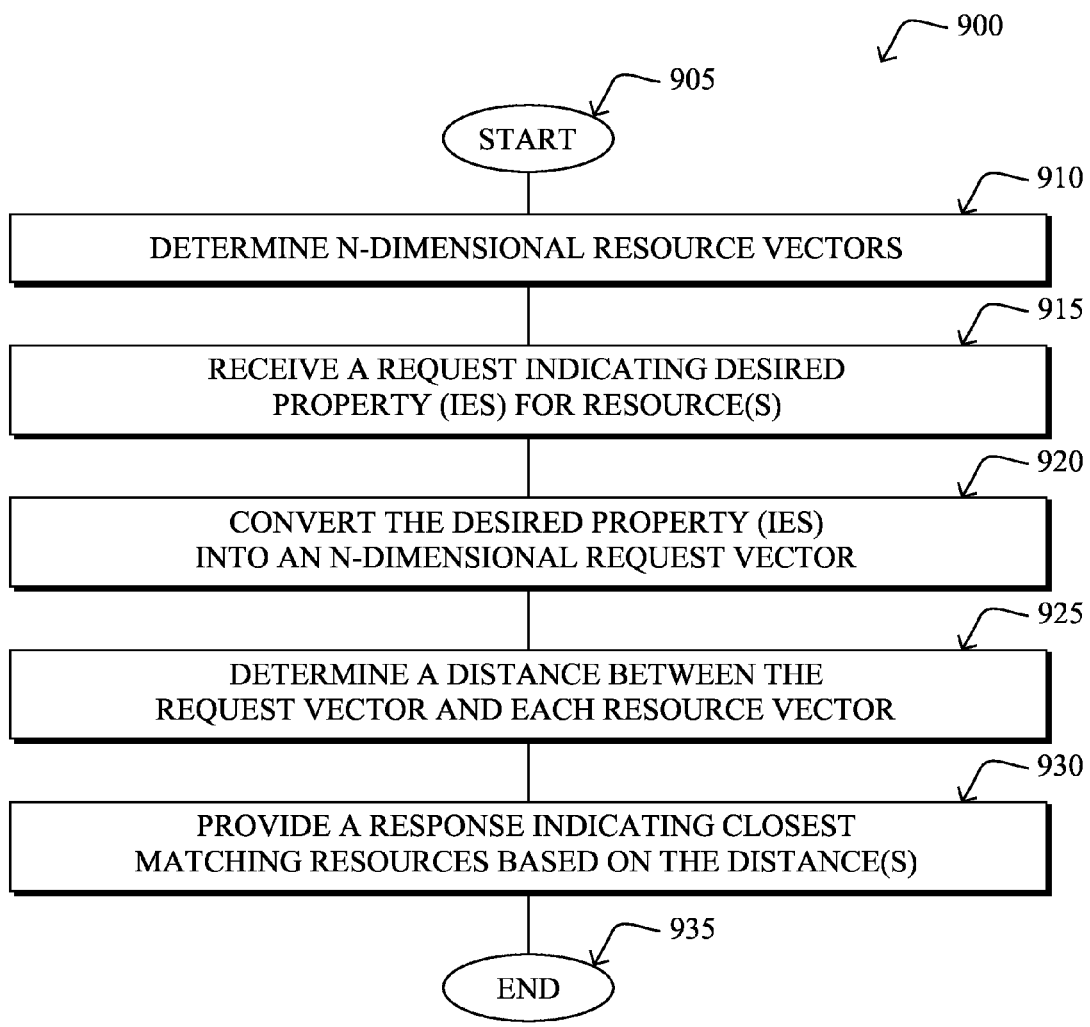
FIG. 9 illustrates an example procedure for resource selection.

FIG. 9 illustrates an example simplified procedure for resource selection in a cloud computing environment in accordance with one or more embodiments described herein. The procedure 900 starts at step 905, and continues to step 910, where, as described in greater detail above, an n-dimensional resource vector is determined (e.g., by resource allocation process 244) for each of a plurality of resources in a computer network. For instance, as described above, the resource property values are converted into n-dimensional resource vectors 310 for each of the resources, where each dimension within the n-dimensional resource vector corresponds to a resource property value or attribute.

Upon receiving a request 180 in step 915 that indicates desired resource properties, resource allocation process 244 converts the request into an n-dimensional request vector 510 in step 920. At step 925, a distance 610 is determined (e.g., by resource allocation process 244) between the request vector 510 and each resource vector 310. As noted above, the distance may be based on one or more weighted attributes/properties, which indicate one or more particularly desired resource properties to be given greater credence than other attributes.

At step 930, a response 190 is provided by the computing device 120 to the requesting device that indicates closest matching resource(s) based on the distance(s), e.g., taking into consideration any thresholds 710/720 as mentioned above. For example, the response may indicate the closest match resource, or else may rank a list of resources, depending upon configuration and/or request parameters. The procedure 900 ends in step 935, notably with the option to return to step 910 to update resource vectors 310, or else directly to step 915 to receive further requests.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a generalized coordinate system and metric-based resource selection framework in a cloud computing environment that provides a simplified yet scalable resource allocation technique for any given request. In particular, the techniques herein provide a distance/metric-based resource selection algorithm that leverages approximate matching/search techniques, and eliminate the necessity of optimization based resource algorithms. This distance based coordinate system and metric-based resource framework determines closest match resources much faster than traditional approaches. In addition, this approach is flexible and accounts for several metrics. In fact, this framework, as discussed above, can apply for resources which include an individual devices, a cluster of devices, or an aggregate number of devices by simply determining a resource vector. For example, in an extreme use case—edge based computing—there are a large number of dynamic resources with varying availability. The coordinate system and metric-based resource selection allows an edge device to quickly choose a resource based on closest proximity, e.g., nearest distance.

While there have been shown and described illustrative embodiments that provide generalized coordinate system and metric-based resource selection framework in a cloud computing environment, it is to be understood that various other adaptations and modifications may be made within the spirit and scope of the embodiments herein. For example, the embodiments have been shown and described herein with relation to particular example resources and resource properties. However, the embodiments in their broader sense are not as limited, and may, in fact, be used with other similar resources and resource properties, as may be appreciated by those skilled in the art.

The foregoing description has been directed to specific embodiments, it will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/ROM/EEPROM, etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining an n-dimensional resource vector for each of a plurality of resources in a computer network, each n-dimensional resource vector having n property values for a corresponding resource of the plurality of resources;
   receiving a request for one or more resources of the plurality of resources, the request indicates one or more desired property values;
   converting the desired property values of the request into an n-dimensional request vector;
   determining a distance between each resource vector and the request vector; and
   providing a response to the request, wherein the response indicates one or more closest match resources for the request based on the distances,
   wherein the resource vector and the request vector have a same number of dimensions, and when the request vector is shorter than the resource vector, a zero value is assigned for each dimension of the resource vector that does not correspond to a dimension of the request vector.

2. The method of claim 1, wherein the response comprises a list of the one or more closest match resources, the method further comprising:
   ranking each indicated closest match resource on the list.

3. The method of claim 2, wherein the ranking further includes ranking each closest match resources based on a prior resource selection.

4. The method of claim 1, further comprising:
   determining a threshold; and
   limiting the one or more closest match resources indicated in the response to resources associated with a distance within the threshold.

5. The method of claim 1, further comprising:
   determining that one or more of the desired property values are weighted; and
   determining the distance between each resource vector and the request vector based on weighting one or more respective dimensions.

6. The method of claim 1, wherein each of the plurality of resources are selected from at least one of: individual resources; resources pools; resource clusters; data centers; collection of devices; virtual machines; or edge computing devices.

7. The method of claim 1, wherein the request further indicates a number "k" of desired closest match resources to be provided by the response, and wherein the response indicates k closest match resources.

8. The method of claim 1, wherein the distance between a particular resource vector and the request vector is the cosine distance between the particular resource vector and the request vector.

9. An apparatus, comprising:
   one or more network interfaces adapted to communicate in a computer network;
   a processor adapted to execute one or more processes; and
   a memory configured to store a process executable by the processor, the process when executed operable to:
      determine an n-dimensional resource vector for each of a plurality of resources in a computer network, each n-dimensional resource vector having n property values for a corresponding resource of the plurality of resources;
      receive a request for one or more resources of the plurality of resources, the request indicating one or more desired property values;
      convert the desired property values of the request into an n-dimensional request vector;
      determine a distance between each resource vector and the request vector; and
      provide a response to the request, the response indicating one or more closest match resources for the request based on the distances,
      wherein the resource vector and the request vector have a same number of dimensions, and when the request vector is shorter than the resource vector, a zero value is assigned for each dimension of the resource vector that does not correspond to a dimension of the request vector.

10. The apparatus as in claim 9, wherein the response includes a list of one or more closest match resources, wherein the process, when executed, is further operable to:
    rank each indicated closest match resource on the list.

11. The apparatus of claim 9, wherein the process, when executed, is further operable to:
    determine a threshold; and
    limit the one or more closest match resources indicated in the response to resources associated with a distance within the threshold.

12. The apparatus of claim 9, wherein the process, when executed, is further operable to:
    determine that one or more of the desired property values are weighted; and
    determine the distance between each resource vector and the request vector based on weighting one or more respective dimensions.

13. A tangible, non-transitory, computer-readable media having software encoded thereon, the software, when executed by a processor, operable to:
    determine an n-dimensional resource vector for each of a plurality of resources in a computer network, each n-dimensional resource vector having n property values for a corresponding resource of the plurality of resources;

receive a request for one or more resources of the plurality of resources, the request indicating one or more desired property values;
convert the desired property values of the request into an n-dimensional request vector;
determine a distance between each resource vector and the request vector; and
provide a response to the request, the response indicating one or more closest match resources for the request based on the distances,
wherein the resource vector and the request vector have a same number of dimensions, and when the request vector is shorter than the resource vector, a zero value is assigned for each dimension of the resource vector that does not correspond to a dimension of the request vector.

14. The computer-readable media as in claim 13, wherein the response includes a list of one or more closest match resources, wherein the software when executed is further operable to:
rank each indicated closest match resource on the list.

15. The computer-readable media as in claim 13, wherein the software when executed is further operable to:
determine a threshold; and
limit the one or more closest match resources to those with corresponding respective distances within the threshold.

16. The computer-readable media as in claim 13, wherein the software when executed is further operable to:
determine that one or more of the desired property values are weighted; and
determine the distance between each resource vector and the request vector based on weighting one or more respective dimensions.

17. The method of claim 1, wherein the property values include at least one of: a latitude; a longitude; a number of virtual machine resources; an outgoing bandwidth; an incoming bandwidth; an average outgoing delay; a communication jitter metric; an available memory; a central processing unit (CPU) count; or a CPU speed.

18. The apparatus of claim 9, wherein the property values include at least one of: a latitude; a longitude; a number of virtual machine resources; an outgoing bandwidth; an incoming bandwidth; an average outgoing delay; a communication jitter metric; an available memory; a central processing unit (CPU) count; or a CPU speed.

19. The non-transitory computer readable media of claim 13, wherein the property values include at least one of: a latitude; a longitude; a number of virtual machine resources; an outgoing bandwidth; an incoming bandwidth; an average outgoing delay; a communication jitter metric; an available memory; a central processing unit (CPU) count; or a CPU speed.

* * * * *